April 15, 1952 R. J. WISE ET AL 2,592,779

TAPE CONTROLLED TELEGRAPH TRANSMITTER

Filed Oct. 26, 1945 6 Sheets-Sheet 1

INVENTORS
R. J. WISE
R. D. PARROTT

BY

A. A. Thomas

ATTORNEY

TAPE CONTROLLED TELEGRAPH TRANSMITTER

Filed Oct. 26, 1945

6 Sheets-Sheet 2

INVENTORS
R. J. WISE
R. D. PARROTT

BY

A. A. Thomas

ATTORNEY

April 15, 1952 R. J. WISE ET AL 2,592,779

TAPE CONTROLLED TELEGRAPH TRANSMITTER

Filed Oct. 26, 1945 6 Sheets-Sheet 3

INVENTORS
R. J. WISE
R. D. PARROTT

BY A. A. Thomas

ATTORNEY

INVENTORS
R. J. WISE
R. D. PARROTT

BY

A. A. Thomas

ATTORNEY

TAPE CONTROLLED TELEGRAPH TRANSMITTER

Filed Oct. 26, 1945 6 Sheets-Sheet 5

INVENTORS
R. J. WISE
R. D. PARROTT

BY

A. A. Thomas
ATTORNEY

April 15, 1952 R. J. WISE ET AL 2,592,779

TAPE CONTROLLED TELEGRAPH TRANSMITTER

Filed Oct. 26, 1945 6 Sheets-Sheet 6

*INVENTORS*
R. J. WISE
R. D. PARROTT

BY

A. A. Thomas

ATTORNEY

Patented Apr. 15, 1952

2,592,779

UNITED STATES PATENT OFFICE 2,592,779

TAPE CONTROLLED TELEGRAPH TRANSMITTER

Raleigh J. Wise, Dunellen, and Robert D. Parrott, West New York, N. J., assignors to The Western Union Telegraph Company, New York, N. Y., a corporation of New York Application October 26, 1945, Serial No. 624,786

17 Claims. (Cl. 178—17)

This invention is for a novel telegraph transmitter in which code marks on a tape are optically scanned at high speed for generating signal carrier of a certain frequency. The tape used in this machine is preferably of white paper on which the message is printed in black code marks, such as dots and dashes.

We provide our transmitter with novel tape driving mechanism which is adjustable to operate the tape at different predetermined speeds. The optical scanning mechanism is adjustable as a unit to a position corresponding to the speed of the tape, which is guided accurately through the scanning field. We also provide means for automatically stopping the tape drive when the tape becomes taut.

Our telegraph transmitter contains a number of other novel features which will be fully explained as the specification proceeds. The accompanying drawings represent an embodiment of our invention as actually installed and operated. In these drawings.

Figure 1:
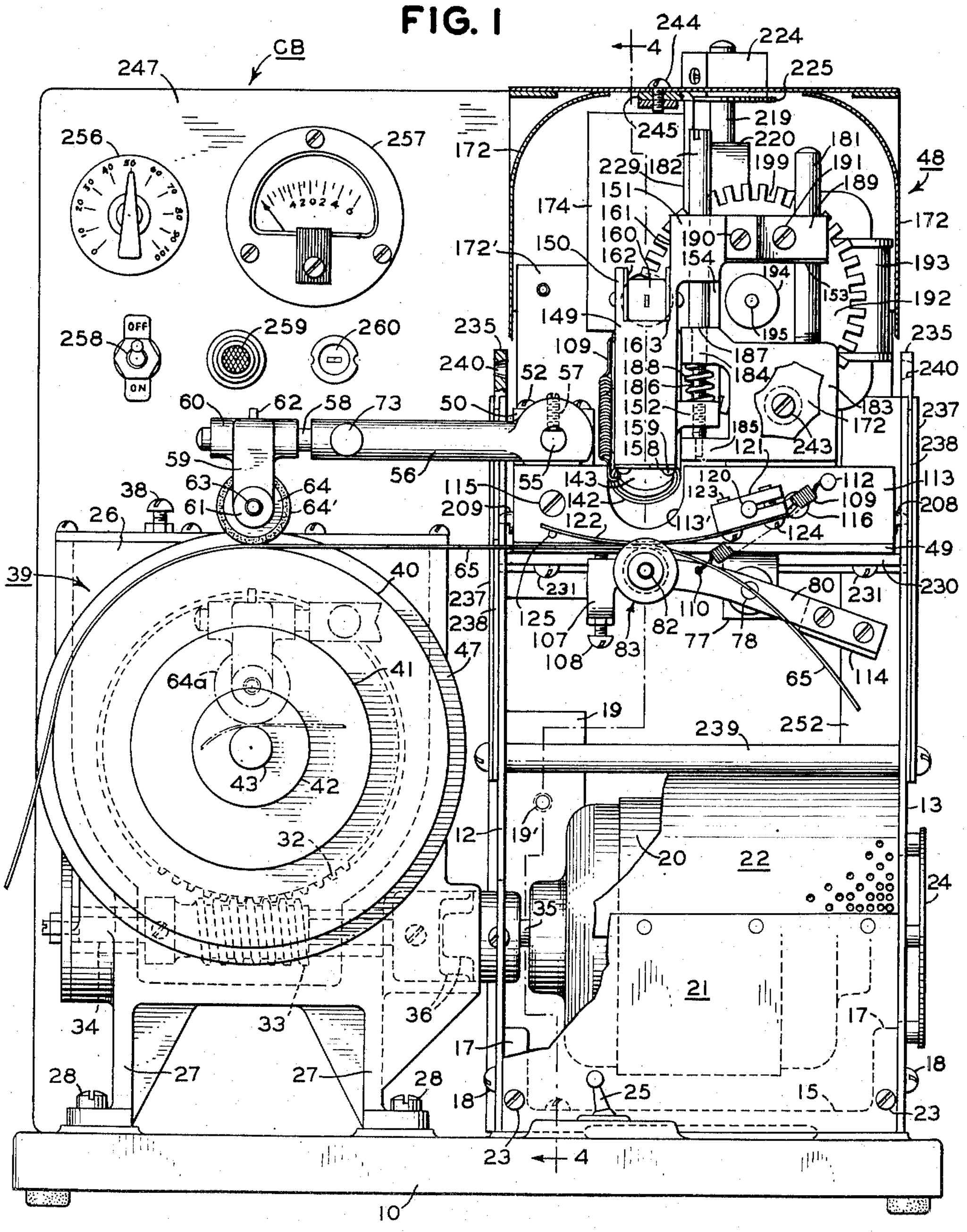
Fig. 1 shows a front view of our code tape transmitter with the cover of the scanning head removed.
Figures 3, 3A:
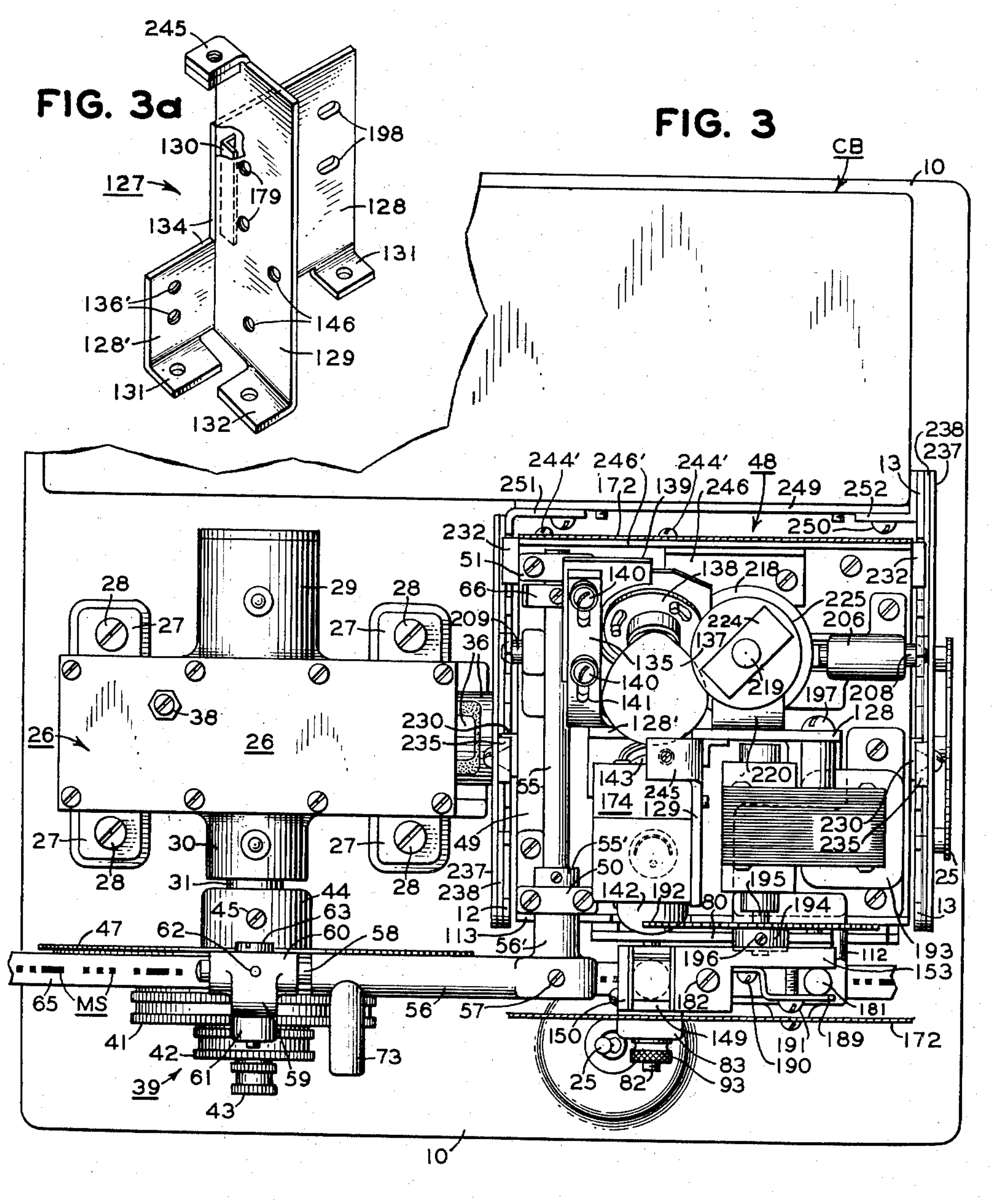
Fig. 3 is a top view of Fig. 1 with the mechanism in the scanning head exposed.
Figures 4, 5, 6, 7:
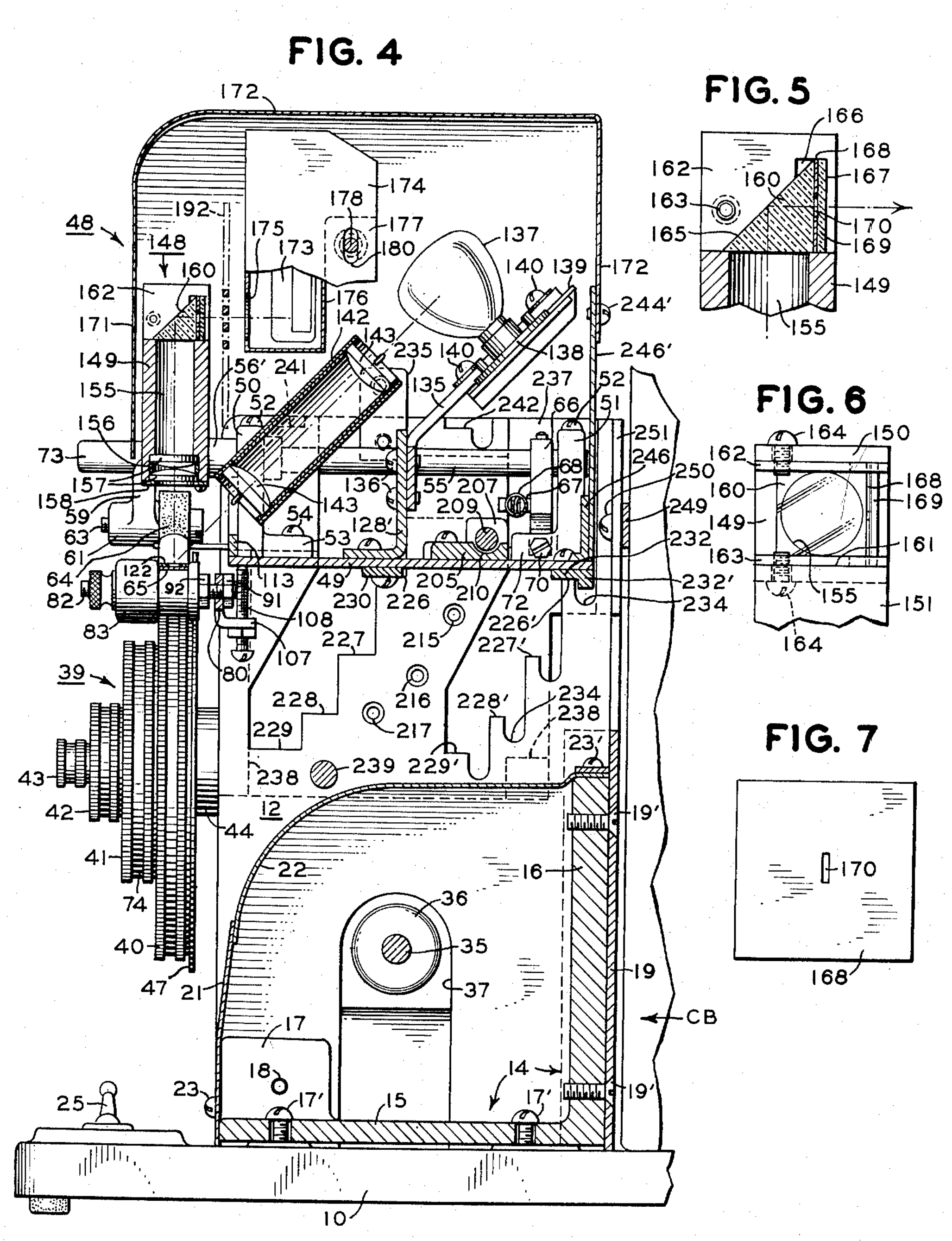
Figures 8, 9, 10, 11, 12, 13:
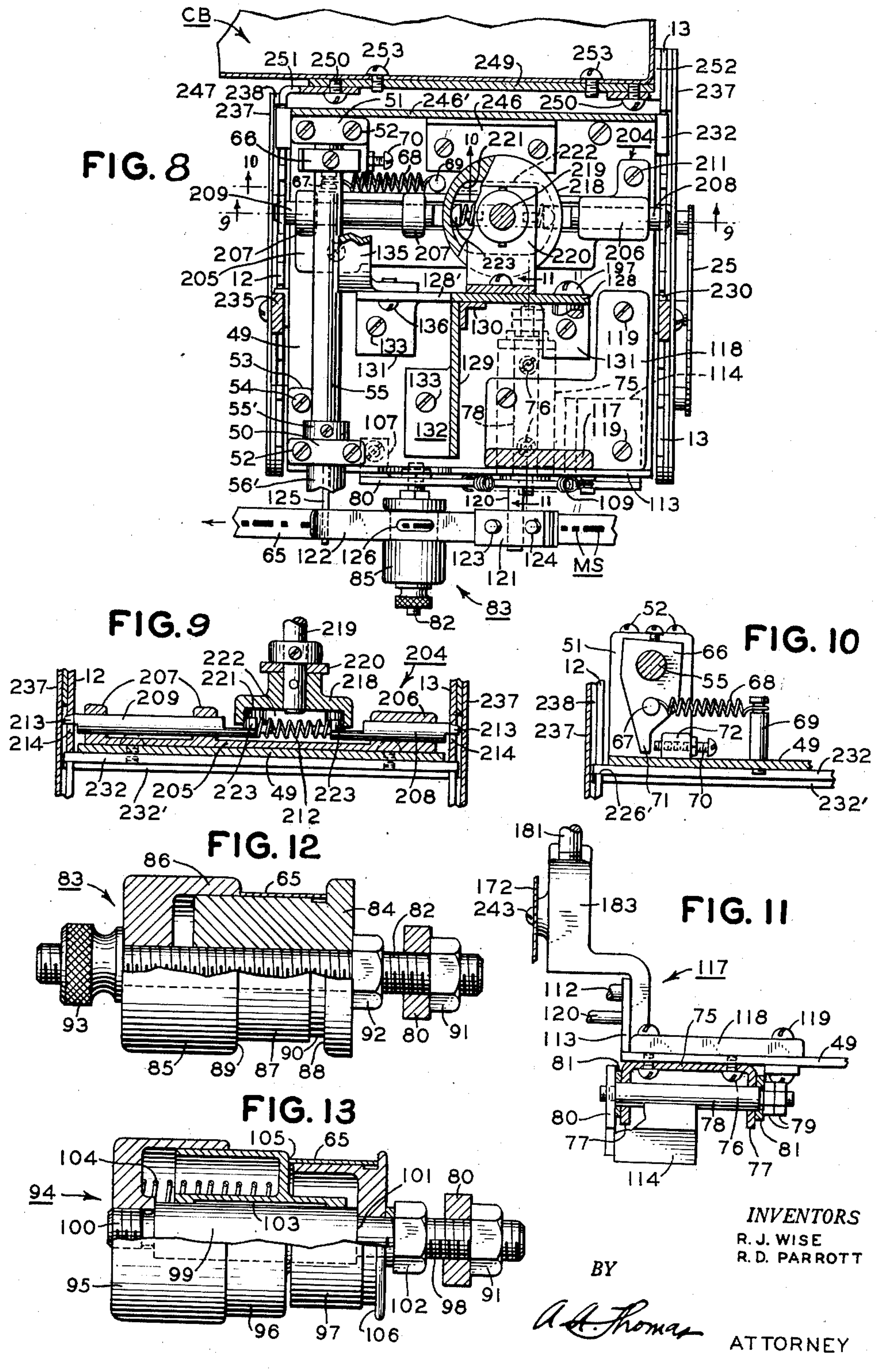

Fig. 3*a* shows a detached perspective of a bracket in the scanning head;

Fig. 4 represents a section on line 4—4 of Fig. 1;

Fig. 5 shows an enlarged sectional view of a detail of the optical scanning mechanism;

Fig. 6 illustrates the same detail in plan;

Fig. 7 is an enlarged face view of an apertured plate used in the scanning mechanism;

Fig. 8 is a view looking down into the scanning head to show the mechanism for adjusting the head to different operative positions;

Figs. 9, 10 and 11 are detailed views on section lines 9—9, 10—10 and 11—11, respectively, of Fig. 8;

Fig. 12 shows an enlarged detached view, partly sectioned, of one form of tape guiding spool used in our transmitter;

Fig. 13 shows another form of spool in magnified dimensions; and

Figure 14:
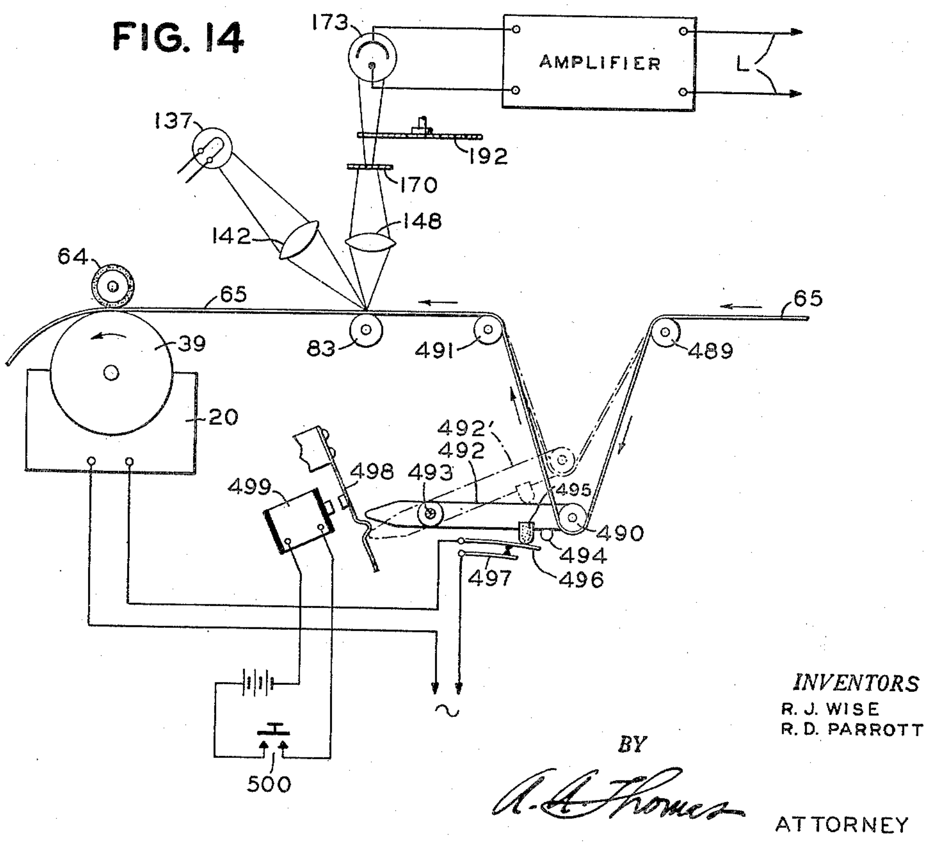

Fig. 14 shows means for automatically stopping the tape feed when the tape becomes taut.

*Tape driving mechanism*

The base 10 of the machine supports a pair of vertical plates 12 and 13 which form a chamber for housing various parts. A right angled casting indicated as a whole by 14 comprises a bottom 15, a heavy back wall 16 and side flanges 17. This casting is secured to base 10 by screws 17′ and the plates 12 and 13 are fastened to the side flanges 17 by screws 18. An angle plate 19 is secured to the rear wall 16 of casing 14 by screws 19′ (Figs. 1 and 4) and extends around the rear edge of supporting plate 12 on the outside to strengthen the structure at that point.

A synchronous motor 20 is mounted on casting 14 between the plates 12 and 13 in any practical way, as by attaching it to the back wall of the casting so as to permit vertical adjustment of the motor. This detail is not shown as it is obvious to any mechanic. The motor 20 is enclosed by a sheet metal cover which consists of a front plate 21 and a perforated top piece 22 suitably secured together, as by rivets. The top piece 22 is curved and rests at its rear edge on the vertical wall 16 of casting 14. The cover 21—22 is fastened to the side flanges 17 of casting 14 by screws 23 (Fig. 1) which permit easy removal of the cover. If desired, the rear edge of the top piece 22 may be fastened to the wall 16 by screws 23′. The motor housing is ventilated through holes in top plate 22 of the cover and through a side opening (not shown) in plate 13, which carries a spaced cover disk 24 over the opening. A suitable switch 25 on base 10 controls the circuit of motor 20.

Figure 2:
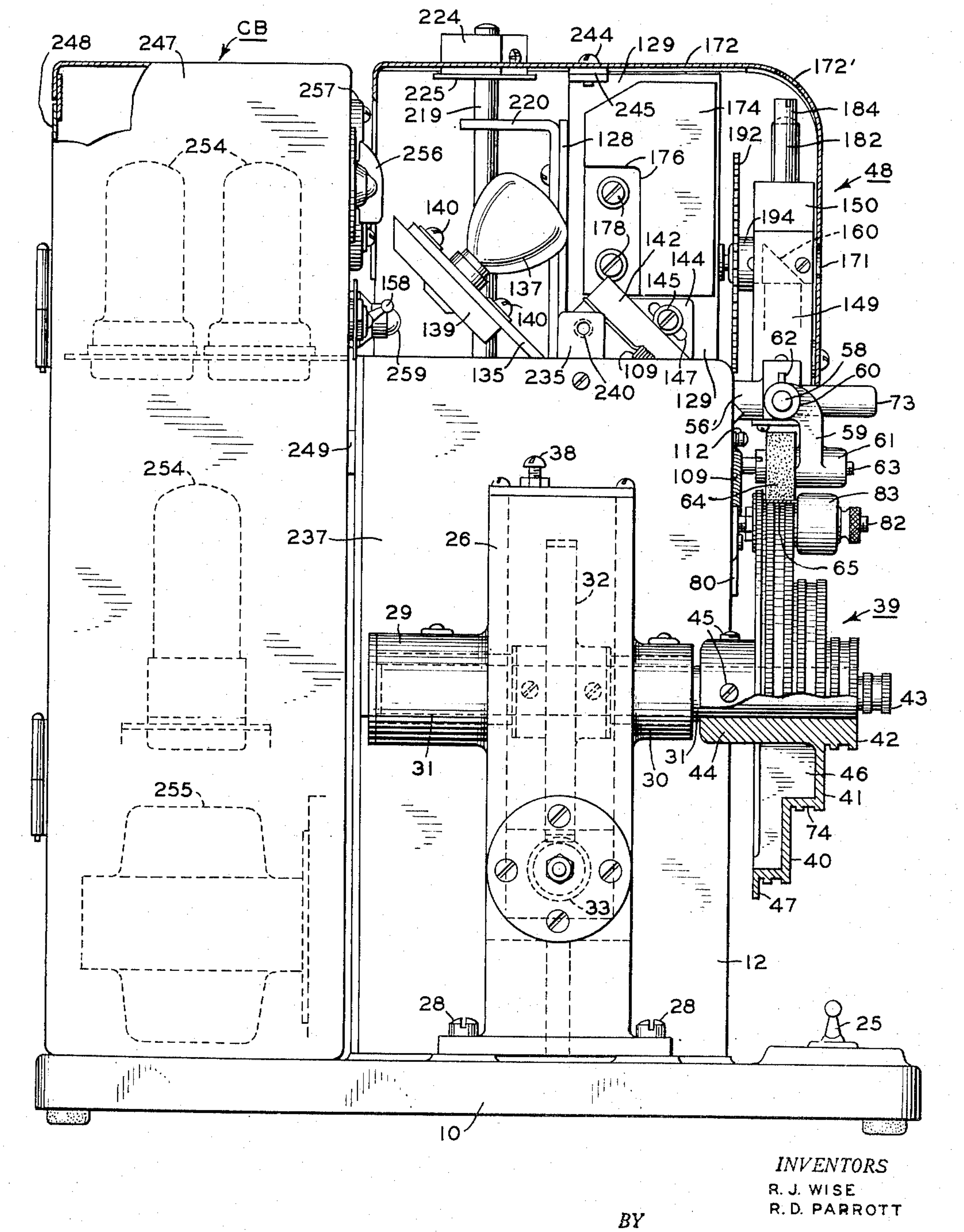
Fig. 2 is a side view of Fig. 1 looking from left to right.

A gear box 26 having legs 27 is mounted on the base 10 by means of screws 28 passing through the legs. As shown in Figs. 2 and 3, the gear box has a pair of aligned hubs 29—30 projecting laterally therefrom and these hubs support a rotary shaft 31 which carries a large helical gear 32. This gear meshes with a helical worm 33 on a shaft 34, which is in line with the shaft 35 of motor 20. A yieldable coupling 36 (Figs. 1 and 3) connects the shafts 34 and 35. The plate 12 is cut away at 37 (Fig. 4) to accommodate the coupling. It will be seen that the motor 20 drives the transverse shaft 21 in gear box 26 at greatly reduced speed as required for any particular design of transmitter. An adjustable set screw 38 projecting through the top of the gear box is provided to adjust a leather brake on the gear 32 so as to prevent the motor 20 from hunting or oscillating under a light load. As this brake arrangement is a well known expedient, we need not show or describe the details thereof. For convenience, we shall designate the synchronous motor 20 as the scanning motor, which runs at a predetermined constant speed.

The outer end of shaft 31 carries a stepped pulley 39 comprising several (in this case four) rims or steps 40, 41, 42 and 43. These four pulley rims always rotate as a unit with shaft 31 and constitute in effect a series of driving pulleys of different diameters. As will presently appear, the purpose of these pulleys is to drive the coded tape for scanning at a preselected speed. A hub or bushing 44 holds the stepped pulley in place on shaft 31. It is convenient to make the pulley parts 40, 41 and 42 as a single casting which can be mounted in proper position on shaft 31 by one or two set screws 45, as shown in Fig. 2. To strengthen this casting, which may be of bronze plated with chromium, radial webs or spokes 46 connect the two larger pulleys 40 and 41. At the rear end of the casting is an annular flange 47 which forms a retaining wall for the tape on pulley 40. The parts 46 and 47 are integral portions of the pulley casting. The outer or smallest pulley 43 may be attached to the end of shaft 31 as a separate piece or it may be made integral with the shaft.

A scanning head indicated as a whole by 48 is mounted directly above the motor housing between the upright plates 12 and 13. This scanning head carries the various parts that compose the optical scanning mechanism of the machine and is adjustable in operative relation to the rims of the stepped pulley 39. The framework of the scanning head has a base plate 49 on which two aligned brackets 50 and 51 (Figs. 4 and 8) are secured by long screws 52 passing down into the base plate. The front bracket 50 has a bracing foot 53 fastened to the base plate 49 by a screw 54.

As shown in Fig. 3, a rock shaft 55 is journaled in brackets 50 and 51. The front end of this shaft extends beyond the bracket 50 and has a lateral arm 56 mounted thereon by means of a hub 56′ which may be integral with the arm. A collar 55′ on shaft 55 cooperates with the hub 56′ to hold the shaft against end play while permitting it to rock as required. The arm 56 is adjustably locked to shaft 55 by a set screw 57. An axial extension 58 on the arm 56 supports a bracket 59 which comprises a sleeve 60 and a hub 61. The sleeve 60 fits over the arm extension 58 and is secured in correct position by a taper pin 62. The hub 61 carries a stud 63 which is screwed in place and supports a pressure roller 64 in alignment with the rim of the pulley to which the scanning head has been adjusted. This adjustment feature will be explained later. For the moment we may assume, as shown in Figs. 1 and 2, that the roller 64 holds the tape 65 against the rim of the largest pulley 40 which pulls the tape at maximum speed past the scanning mechanism.

The roller 64 is held in pressure contact with the tape on the pulley by means of an arrangement located in the scanning head. Referring to Figs. 8 and 10, a collar block 66 is fixed on the shaft 55 near the rear supporting bracket 51. This block extends downward and carries a pin 67, to which one end of a coil spring 68 is attached. The other end of this spring is fastened to a post 69 on base plate 49. The spring 68 tends to rock the shaft 55 and arm 56 counterclockwise, as viewed in Fig. 1, so that the roller 64 is constantly pressed against the tape. While the arm 56 is free to be raised against the action of spring 68, the downward or pressure motion of the arm is limited by an adjustable stop 70 (Fig. 10) arranged to be engaged by an extension 71 on the block 66. The stop 70 may simply be a screw adjustably mounted in a footpiece 72 of bracket 51. The pressure arm 56 is provided with a handle 73 to facilitate manipulation of the arm when required.

To improve the traction on the tape 65, the pressure roller 64 has a rubber rim 64′ and the rims of the stepped pulley 39 are knurled or otherwise roughened. As seen in Figs. 2 and 4, the pulley rims are formed with a central groove 74 so that the middle portion of the tape, where the message code marks MS are printed, is free of the knurled rim surfaces. This keeps the message portion of the tape smooth and unmarred for repeated scannings in case that should be necessary. If desired the rim of roller 64 may also be grooved at the center to avoid contact with the code marks on the tape. It should be noted that the swivel mounting of the roller 64 on arm 58 permits adjustment of the roller transversely of the pulley rims to let the roller rest firmly and evenly across the knurled surface of the pulley.

*Tape guide assembly*

Referring to Fig. 11, the base plate 49 of the scanning head carries underneath a bracket 75 attached by screws 76. This bracket has a pair of depending flanges 77 in which a pivot bolt or stud 78 is rotatably mounted. The two ends of bolt 78 are screw-threaded and the rear end has a pair of nuts 79 mounted thereon to adjust the bolt axially and lock it in position. On the front end of shaft bolt 78 is screwed an arm 80 which is thereby supported for vertical rocking movement. Washers 81 are placed against the fixed flanges 77 to provide bearing surfaces between these flanges and the rotating parts 79 and 80 of the tape guide. Any other practical mounting may be provided for the arm 80 which we call the tape guide arm.

As best shown in the enlarged view of Fig. 12, the arm 80 carries a screw-threaded pin 82, on which a spool 83 is mounted to guide the tape in correct position across the optical scanning field. In the particular form here illustrated, the guide spool 83 consists of two metal parts 84, 85, which are screwed on the pin or stud 82 so as to be separately adjustable along the pin. The part 85 has a tubular extension 86 adapted to receive the cylindrical end of part 84, which provides a smooth cylindrical surface 87 for the moving tape 65. The spool does not rotate and the tape slides over its cylindrical surface with scarcely more than a transverse line of contact.

The tape receiving surface or groove 87 of the guide spool 84 is bounded laterally by annular shoulders 88 and 89 on parts 84 and 85, respectively. These two parts are so adjusted on stud 82 that the tape groove 87 not only has the correct width but is locked in proper horizontal alignment with respect to the scanning beam. The width of groove 87 will depend upon the width of tape 65. It should slide easily over the spool without binding and without lateral play. The groove 87 is preferably undercut at 90 adjacent to the shoulder 88 to eliminate a rounded corner for the rear edge of the tape. A nut 91 locks the stud 82 and spool 83 as a unit on the arm 80. The parts 84 and 85 are locked in their adjusted positions by nuts 92 and 93. The outer nut 93 is preferably knurled for easy manipulation.

In Fig. 13 we disclose a modified form of tape guide spool 94 in which the width of the tape groove automatically adjusts itself to variations in the width of the running tape. Here the spool consists of three cylindrical parts 95, 96, 97, mounted on a stud 98 which is screw-threaded only at its ends and has a smooth cylindrical middle section 99. The outer part 95 of the spool is screwed on the outer end 100 of stud 98 and the inner part 97 is held firmly against the end shoulder 101 of the cylindrical section 99 by a nut 102. The middle part 96 has a hub or sleeve 103 slidable on the section 99 and constantly urged toward the part 97 by an expanding coil spring 104. It is clear that the annular shoulder 105 on the movable part 96 forms a yieldable side wall for the cylindrical tape receiving groove of the fixed part 97, which has a cylindrical shoulder or flange 106 forming the rear wall of the tape groove. The coil spring 104 is so light that the shoulder 105 presses very gently against the edge of the tape and readily accommodates itself to variations in the width of the running tape. Otherwise what has been said for the tape guide spool 83 applies to spool 94.

We have described how the tape guide spool 83 is adjustable horizontally along its supporting pin or stud 78 and now we shall explain how the spool can also be adjusted in a vertical plane. The front end of arm 80 has a lateral extension 107 which terminates beneath the base plate 49 of the scanning head, as shown in Fig. 4. A screw 108 mounted in extension 107 projects upward against the base plate 49 and is constantly held against this plate by a contracting coil spring 109. One end of this spring is attached to arm 80 at the point 110 and the other end is fastened to a pin 112 on a plate 113 which extends along the front edge of the base plate 49. It is clear from Fig. 1 that the spring 109 tends to rock the arm 80 clockwise about its pivot 78, thereby holding the tape groove of guide spool 83 in the proper vertical plane as determined by the adjustment of screw 108. A weight 114 on the rear end of arm 80 projects rearwardly to counterbalance the weight of the metal spool 83 which projects forwardly at the other end of the arm. This removes any twisting strain from the guide arm 80.

The front plate 113 is fixed on base 49 in any practical way, as by screws 115 and 116 entering conveniently located parts carried by the scanning head base. Screw 115 goes into bracket 50 and screw 116 fastens into a bracket 117 against which the plate 113 abuts, as shown in Fig. 11. The bracket 117 has a footpiece 118 which is secured to base 49 by screws 119. The plate 113 carries a stud 120 which supports a split block 121. To the bottom of this block is fastened one end of a metal leaf spring 122 by screws 123 and 124. The free end of spring 122 rests on a pin 125 projecting from the front plate 113. As a result of this mounting, the leaf spring 122 is bowed downward at the center where it presses on the tape 85 in the guide groove 87 of spool 83.

The leaf spring 122, which is slightly narrower than the tape and fits into the guide groove 87, has a central longitudinal slot 126 (see Fig. 8) directly over the spool 83. The purpose of slot 126 is to expose the code marks on the tape to the scanning light. The pressure of the leaf spring 122 on the tape is adjustable to the right amount by changing the angular position of block 121. That is readily done by simply loosening the screw 124 to permit turning of the block either way, then tightening up the screw. As seen in Fig. 1, the plane in which the tape is guided over the spool 83 is in horizontal alignment within the plane of traction on the pulley rim 40. The pressure of leaf spring 122 of the tape keeps the running tape taut and smooth. The tape feeding into the machine should be free or on a reel which is free to rotate.

An important feature of our novel guide spool mounting is the ease with which the tape can be inserted in correct scanning position. The operator grasps a length of tape with both hands and places it on the front cylindrical surface 85 of spool 83 which (let us assume) has already been adjusted horizontally and vertically. Still holding the tape on surface 85, the operator pulls down on the tape and thereby lowers the spool until there is a fair space between the spool and the leaf spring 122. The tape is now slid rearward until it drops automatically into the groove 87 under the leaf spring. Upon release of the tape, the spool will rise and bring the tape into contact with leaf spring 122 which will be slightly deflected to maintain pressure on the tape. These observations also apply to the spool 94 of Fig. 13.

*Optical scanning apparatus*

Before describing the details of the optical scanning device associated with the tape driving and guiding mechanism of our transmitter, we wish to make it clear that this scanning device contains features of novelty which are not a part of our invention and which form the subject matter of the copending divisional application of Raleigh J. Wise and Garvice H. Ridings, Serial No. 208,035, filed January 26, 1951. The reason why those novel features of the optical scanner are described here is that for a complete showing of our transmitter in the drawings we had to take in certain details of the scanner which are claimed in said divisional application.

The various parts that make up the optical scanning mechanism of our transmitter are housed within the lightproof chamber of the scanning head 48. On the base plate 49 of the scanning head is mounted an upright bracket constructed as shown in Fig. 3a and indicated as a whole by 127. This bracket consists of two sheet metal plates 128 and 129 arranged at right angles and secured together in any practical way, as by an angle bar 130 welded or riveted to the plates. The plate 128 has a pair of footpieces 131 and the plate 129 has a footpiece 132. Screws 133 passing through these footpieces (see Fig. 8) secure the bracket as a unitary structure to the base plate 49. The bracket is so positioned that the plate 128 extends lengthwise of the scanning head and the plate 129 goes from front to rear. The plate 128 is cut away at 134 to provide room for certain optical parts, as will be seen shortly.

Referring to Fig. 4, there is an arm 135 fastened to a rear extension 128′ of bracket plate 128 by screws 136 which pass through holes 136′ in bracket 127. The arm 135 extends upward and rearward at an angle of 45° and supports an exciter lamp 137, preferably of the prefocused spotlight type. This lamp is mounted in a suitable socket 138 which is attached to a plate 139 carried by the arm 135. The plate 139 is secured to the underside of arm 135 by screws 140 which pass through slots 141 in the arm as seen in Fig. 3. In this way the lamp 137 is adjustable lengthwise of the arm 135 which may itself be adjustable vertically on bracket 137 by passing the screws 136 through vertical slots either in the bracket or in the arm. The purpose of this double adjustment of the exciter lamp 137 is to focus a spot of scanning light sharply on the tape.

Light from the exciter lamp 137 passes through a projection lens assembly 142, mounted in front of the lamp at an angle of 45°. We shall not go into the structural details of this device for they are old in the art and are well understood. A tube or barrel containing the usual lenses 143 is soldered or otherwise fastened along one side to a plate 144 (see Fig. 2) and this is attached by screws 145 to the plate 129 of bracket 127. Only one screw 145 is shown in Fig. 2, but the position of the other screw will be apparent from Fig. 3*a* where the holes 146 are for the screws 145. The plate 144 may have screw slots 147 to permit axial adjustment of the lens tube 142 with respect to the lamp 137. The purpose of the optical unit 142 is to project a bright spot of light on the tape as it passes over the spool 83. The illuminated area of the tape is the surface exposed by the slot 126 of spring 122, as will be clear from Fig. 9. The front plate 113 (see Fig. 1) is cut away at 113' to make room for the light issuing from the projection tube 142. By making proper adjustments of the exciter lamp 137 and the projection tube 142, a uniform illumination of the tape at the scanning point is obtained.

The light projected by the tube 142 onto the tape is reflected through a pickup lens assembly 148 which is arranged in vertical position directly over the scanned area of the tape. As this device comprises several novel features, we shall describe the construction more fully. As seen in Fig. 1, the outer part of this assembly is a casting of peculiar shape comprising a hollow column or tube 149, an upright extension 150 rising from the top of the column, a pair of thick lateral lugs 151 and 152 arranged in vertical alignment, and a lateral extension 153 on the upper lug 151. The lugs 151 and 152 may be connected at their rear edges by a strengthening rib 154. This unitary structure of parts 149 to 154 is preferably a one-piece casting of bronze or like material.

Referring to Fig. 4, the tube 149 has a cylindrical bore 155 which terminates at the bottom in a chamber 156 for a pair of lenses 157. These are held in place by a ring 158 which is secured to the bottom edge of the tube in any practical way as by screws 159. On the top rim of tube 149 rests a right angled prism 160 which is fitted between the extension 150 and the inner wall 161 of lug 151. The prism 160 is clamped in place by a pair of small plates 162 and 163 (see Figs. 5 and 6) which are secured to their respective walls 150 and 161 by screws 164.

The plates 162 and 163 are alike and each is cut away to provide a sloping edge 165 and a rectangular slot 166 which has a rear vertical edge 167. Immediately behind the prism 160 is a metal plate 168 and back of that is a glass plate 169. When the metal plates 162 and 163 are in position, as shown in Figs. 5 and 6, the sloping edges 165 bear down on the two side edges of the sloping face of prism 160. As a result the prism is forced downward and rearward so that the glass plate 169 is pushed against the vertical edge 167 of slot 166. Therefore, the parts 160, 168 and 169 are secured as a unit to the top of tube 149.

The metal plate 168 has a minute rectangular slot 170 which determines the effective scanning area of the illuminated tape surface, as will presently be explained more fully. By enclosing the plate 168 between two glass surfaces, the aperture 170 is completely protected from dust. This feature is of practical importance because the aperture 170 is so small that even particles of dust adhering to the edge would appreciably interfere with the passage of light therethrough. The pickup lens assembly 148 throws a sharp enlarged image of the illuminated area of the tape onto the apertured plate 168. The use of the right-angled prism 160 gives a double advantage; it produces a more compact unit and also allows the operator to view the image on plate 168 through a front opening 171 in the hood or cover 172 of the scanning head. This is clear from Fig. 4. The hood 172 is preferably made of sheet metal painted flat black on the inside.

The light that passes through the aperture 170 of plate 168 strikes the sensitive electrode of a photocell 173 contained in a metal housing 174 which acts as an optical and electrical shield. The photocell 173 is preferably of the gas type because the sensitivity is much greater than for a vacuum type. A hole 175 in the front wall of the housing (Fig. 4) allows the passage of light from the pickup lens assembly to the electrode of the cell. The housing 174 is cut away at the back to form an outer recess 176 (Figs. 2 and 4), but the right wall of the housing is left entire to provide a rectangular panel 177 for receiving screws 178 which secure the housing to the plate 129 of bracket 127. In Fig. 3*a*, the holes 179 in bracket plate 129 receive the screws 178. To permit vertical adjustment of the housing the screws 178 pass through vertical slots 180 in panel 177, as shown in Fig. 4.

The pickup lens assembly 148 is adjustable as a unit up and down to focus the image of the tape on the plate 168. Referring to Fig. 1, there are two vertical rods 181 and 182 mounted in a thick plate 183 which forms a vertical extension of the bracket 117. The form of this bracket, which is cast in one piece and mounted on base plate 49, is clearly shown in Fig. 11. The rod 181 is screwed into the bracket plate 183 and remains fixed to act as a guide rod. The other rod 182, which has a screw driver slot on top for adjustment, passes rotatably through the lugs 151 and 152 of the pickup tube 149 and through lugs 184 and 185 of bracket plate 183. The rod 182 has a screw threaded section 186 between the supporting lugs 184 and 185, and this part of the rod has a screw connection with the lug 152 of pickup tube 149. The upper section of rod 182 is of slightly greater diameter than the rest of it to provide a shoulder 187 which rests on top of lug 184. The downward pressure of a coil spring 188 mounted on rod 182 between the fixed lug 184 and the movable lug 152 holds the shoulder 187 permanently against the lug 184.

As shown in Fig. 3, the fixed rod 181 passes between the extension 153 of the pickup tube casting and a metal strip 189 which is secured to the casting by a screw 190. Another screw 191 can be made tight or loose to clamp the pickup tube casting against the guide rod 181 or to release it for vertical adjustment. When the operator wants to adjust the pickup tube 149, he first loosens the screw 191, then turns the screw rod 182 to move the lens assembly up or down while he is watching the image on plate 168 through the peep hole 171. When the image is sharply focused, he tightens the clamping screw 191 and the lens assembly remains in adjusted position. The hood or cover 172 of the scanning head has a hole 172' (Fig. 2) for the insertion of a screw driver to turn the focusing rod 182.

The passage of light from the pickup lens assembly 148 to the photocell 173 is interrupted by a chopper disk 192 driven by a motor 193 which may be an A. C. induction motor. The disk has a hub 194 which is suitably fastened to the end of the motor shaft 195, as by a set screw 196. The motor 193 is mounted on bracket plate 128 by a pair of screws 197. The upper screw is shown in Fig. 3 and the lower one in Fig. 8. These two screws pass through horizontal slots 198 in bracket plate 128 so that the motor and chopper disk can be adjusted laterally of the pickup tube 148 to center the peripheral slots 199 of the disk with respect to the beam of light passing to the photocell 173. As is well known, the purpose of a chopper disk in optical scanners is to generate a signal carrier of a predetermined frequency depending upon the speed of the disk and the number of slots or teeth it has.

*Adjustability of scanning head*

It is clear from Fig. 1 that the position of the scanning head 48 depends upon which rim of the stepped pulley has been selected for driving the tape. For this purpose we have provided novel means for adjusting the scanning head to as many positions as there are driving rims on the pulley. In the present embodiment, which represents a machine actually constructed, the four-rimmed pulley 39 was designed to operate the tape at speeds representing the transmission of 50, 150, 300, and 500 words a minute. If the machine were designed for a different set of transmission speeds, say, for 200, 600, 1200, and 2000 words a minute, the motor speed or the transmission ratio will be changed accordingly. In Fig. 1 the scanning head and the pressure roller 64 are shown in the highest speed position and the dotted outline 64*a* indicates the lowest speed position of the pressure roller. Since the tape driving rims 40 to 43 are in different vertical planes, the scanning head 48 must be adjusted not only up and down but also backward and forward. We shall now describe the mechanism by which this double adjustment is accomplished.

Referring to Figs. 8 and 9, there is a low elongated casting indicated as a whole by 204 mounted on the base plate 49 of the scanning head toward the rear thereof. This casting comprises a base portion 205, a long lug 206 at one end and a pair of spaced lugs 207 at the other end. The lug 206 supports a slidable bolt 208 and the spaced lugs 207 support a slidable bolt 209. If necessary, the base portion 205 of the casting may be grooved at 210 (see Fig. 4) to make room for the two horizontal bolts. The casting 204 is secured to the base plate 49 by screws 211. An expanding coil spring 212 arranged between the inner ends of bolts 208 and 209 normally holds the conical outer ends 213 of the bolts in locking engagement with conical holes 214 in the upright supporting plates 12 and 13. The lower half of each bolt end 213 is cut away so that the spring pressed bolts act like cams which force the scanning head downward for a purpose to be presently explained. Since there are four positions for the scanning head in this machine, the plates 12 and 13 are provided with three additional pairs of conical holes 215, 216 and 217, arranged as shown in Fig. 4, for the locking bolts 208 and 209 in the other three positions of the scanning head.

The locking bolts 208 and 209 are operated to releasing position by a rotary cam disk 218 carried on the lower end of a vertical shaft 219 which is rotatably supported at both ends by a bracket 220 attached to the back of bracket plate 128 (see Figs. 2, 3 and 8). The bottom of disk 218 has a cam shaped recess with two arcuate walls 221 concentric with shaft 219 and two straight walls 222. The inner ends of bolts 208 and 209 have upstanding projections 223 arranged to engage the walls 221 and 222. As apparent from Fig. 8, the bolts 208 and 209 remain in locking position when the projections 223 engage the arcuate walls 221 of cam disk 218. When the disk is given a 90° turn, the projections ride over the cam walls 222 and the bolts are withdrawn out of the holes 214 (or 215, 216 and 217, as the case may be) thereby releasing the scanning head for adjustment to any other position. The cam shaft 219 projects through a hole in the top of scanning head cover 172 and has a suitable knob 224 for manipulation of the shaft. A disk 225 may be attached under the knob 224 to cover up the hole through which the shaft projects.

Referring to Fig. 4, each of the upright plates 12 and 13 is cut away to provide four pairs of steps 226—226′, 227—227′, 228—228′ and 229—229′. These two series of steps are arranged on opposite sides of the bolt holes 214 to 217, and the steps of each pair are in horizontal alignment. Only the left hand plate 12 is shown in Fig. 4, but it will be understood that the right hand plate 13 is similarly constructed. The front steps 226 to 229 are arranged to be engaged by the ends of a flat cross bar 230 fixed to the underside of base plate 49 by screws 231. The rear steps 226′ to 229′ receive the ends of an angle bar 232 secured to the underside of base plate 49 at the rear edge thereof. The depending flange 232′ of angle bar 232 rests in a notch or slot 234 cut behind each step 226′ to 229′ whereby the scanning head is held against sliding forward accidentally when the bolts 208 and 209 are in releasing position.

It will now be clear how the scanning head 48 can be adjusted to any one of the four tape transmission speeds. Supposing we want to adjust the scanning head from the topmost position shown in Fig. 1 to its lowest position where the pressure roller 64 engages the smallest pulley rim 43. Without removing the hood or cover 172 of the scanning head, the operator first gives the knob 224 a quarter of a turn to retract the locking bolts 208 and 209. The scanning head is still supported by the cross bars 230 and 232 on the steps 226 and 226′, respectively. The operator now lifts the scanning head a little to clear the angle bar 232 of step 226′. Then he lowers the head while bringing it forward until the cross bars 230 and 232 rest on the steps 229 and 229′. The knob 224 is given another quarter of a turn to move the ends of bolts 208 and 209 through the lowest pair of holes 217 in the supporting plates 12 and 13. The downward pressure of spring 212 on the ends of bolts 208 and 209 holds the cross bars 230 and 232 firmly against their seats and the scanning head is securely locked in adjusted position.

The staggered arrangement of the front steps 226 to 229, the bolt holes 214 to 217, and the rear steps 226′ to 229′ is such that the pressure roller 64 and the tape guide spool 83 are automatically positioned in operative alignment with the particular pulley rim 40 to 43 for which the scanning head has been adjusted. We also provide means for supporting the scanning head above the plates 12 and 13 in a position for easy inspection of the interior mechanism. For this purpose there are two short vertical bars 235 projecting above the supporting plates 12 and 13. These bars are secured by screws 236 to short outer plates 237, which extend partway over the long plates 12 and 13 and are spaced therefrom by strips 238 welded in place. A tie rod 239 may be used for securing the lower ends of plates 237 to plates 12 and 13 and also for strengthening this composite plate structure as a whole. The outer plates 237 not only cover the steps and cut out portions of plates 12 and 13, but also provide a space for the protruding ends of the locking bolts 208 and 209 and of the cross bars 230 and 232.

The upright projecting bars 235 have conical holes 240 for receiving the ends of bolts 208 and 209. Each of the vertical plates 12 and 13 is provided on its top edge with a front step 241 and a rear step 242 (see Fig. 4) for receiving the ends of cross bars 230 and 232, respectively, when the bolts 208 and 209 are in locking engagement with the vertical bars 235. The scanning head is thus safely supported in a high forward position for inspection of the parts and for preliminary testing of the scanning mechanism to insure proper operation. The hood or cover 172 of the scanning head is held in place by a screw 243 at the front, another screw 244 at the top, and a pair of screws 244' at the back. The front screw 243 goes into the bracket plate 183 (Fig. 11) and the top screw 244 connects with a reinforced flange 245 on the bracket plate 129, as shown in Figs. 2 and 3*a*. An angle bracket 246 (Fig. 4) secured to the base plate 49 at the rear edge thereof supports an upright plate 246' to which the rear wall of the cover 172 is attached by the screws 244'.

*Amplifier cabinet*

A closed upright cabinet indicated as a whole by CB is mounted on the main base 10 behind the gear box 26 and the scanning head 48. This cabinet is a sheet metal structure of rectangular shape comprising a front panel 247, a hinged door 248 at the back, and the usual top, bottom and sides which require no further mention. A horizontal bar 249 is fastened by screws 250 to a pair of angle irons 251 and 252 at the rear ends of the vertical plates 12 and 13. The angle member 251 is shown in Figs. 3 and 9 as an integral flange on plate 12. The front panel 247 is fastened to the cross bar 249 by screws 253 which are accessible at the back of the cabinet, so that the latter is easily mounted in position or removed when required. For strength of structure, the bottom of the cabinet is screwed to the main base 10.

The purpose of cabinet CB is to house the parts that comprise the vacuum tube amplifier for the photocell 173 and for that reason we call it the amplifier cabinet. It will not be necessary to show or describe how these various parts, such as tubes, condensers, transformers, resistors, etc., are mounted and arranged inside the cabinet because such mounting and arrangement are merely mechanical expedients which do not belong to our invention. It is sufficient to indicate in Fig. 2 by means of dotted outlines a few typical parts in the cabinet, such as tubes 254 and a transformer 255.

The arrangement of the amplifier cabinet CB behind the low mounting of the tape driving pulley enables us to use the upper left hand portion of the front cabinet wall 247 as a control panel for the amplifier. This panel carries an output level control 256, an output level indicator 257, a power switch 258, a pilot lamp receptacle 259 and a fuse 260. When the switch 258 is closed and the electric power is on, a red light shines through the lens of receptacle 259. The output level control 256 enables the operator to adjust the output of the amplifier to a predetermined level as indicated by the instrument 257 which is a decibel meter of well known construction and requires no description. The motor switch 25 on the base 10 of the transmitter is not closed until all the preliminary adjustments have been made and the tape has been loaded into the machine.

*The taut-tape safety arrangement of Fig. 14*

In a preferred embodiment of our invention, we find it desirable to provide the transmitter with safety means when something happens to the tape, such as suddenly becoming taut. In that event, to prevent tearing of the message bearing tape, we provide means for automatically stopping the tape driving motor 20. Referring to Fig. 14 the tape entering the machine passes over a fixed guide member 489, then loops around a movable guide member 490, then passes over another fixed guide member 491 before being scanned. The guide member 490 is mounted on one end of an arm 492 pivoted at 493. The arm 492 is normally held against a fixed stop 494 by the weight of member 490 which may be a heavy metal roller. An insulated projection 495 normally closes a pair of switch contacts 496 and 497 in the circuit of motor 20.

As long as the tape 65 runs freely through the machine during the scanning operation, the arm 492 holds the motor switch 496—497 closed. Should the tape suddenly become taut, the continued pull on the tape by the driving pulley 39 lifts the arm 492 up and the released switch contacts 496—497 spring open so that the motor 20 stops. The operated position of arm 492 is indicated by the dotted outline 492'. A spring detent 498 automatically locks the arm 492 in raised position until released by the operator to start the motor again. The release of the detent may be done manually or remotely by an electromagnet 499 and a push button 500 placed at a convenient point. When the magnet is energized, the detent is operated to release the arm 492 which drops by gravity to circuit closing position.

It is hardly necessary to add that the specific apparatus which we have described represents but one form of our invention and is not to be taken as a restriction or limitation thereof. Modifications and variations may occur to those skilled in the art without departing from the nature and scope of our invention as defined in the appended claims.

We claim as our invention:

1. In combination with optical scanning mechanism for a marked tape, a pair of members between which the tape is held in spring pressure contact and guided across the scanning spot of said mechanism, said members being reversely curved to provide only a narrow transverse line of contact with the tape, one of members having an opening for the passage of the scanning beam.

2. A code tape transmitter having optical scanning mechanism, a grooved roller for supporting the tape in the scanning field of said mechanism, and a leaf spring for holding the tape in the groove of said roller, said leaf spring being curved reversely to said roller so as to provide only a narrow transverse line of contact with the tape, said leaf spring having a slot in alignment with the code marks on the tape for the passage of the scanning beam.

3. In a code tape transmitter having optical scanning mechanism and tape driving means, a guide for holding the tape in the optical field, said guide comprising a member with a groove adapted to receive the tape against lateral displacement, and a leaf spring for holding the tape in said groove, said leaf spring being bent in an arc which curves away from the tape so as to engage the same only along a narrow transverse line of contact, said spring having a slot for the passage of scanning light to the tape.

4. In a tape telegraph transmitter having optical scanning mechanism, a stud supported at one end and having screw threads at its other end, a guide member mounted on said stud and having a groove for holding the tape in scanning position, and means whereby the width of said groove is adjustable so that the tape will slide through without binding, said means including a cylindrical part adjustably mounted on said screw-threaded end of the stud.

5. A tape guide for telegraph apparatus comprising a member mounted on a fixed stud and provided with a groove for guiding the tape through the scanning field of the apparatus, said groove having a yieldable side wall which automatically adjusts itself to prevent binding of the tape, a cylindrical part mounted on said stud by means of screw threads so as to be manually adjustable along said stud, and an expanding coil spring arranged between said cylindrical part and said yieldable side wall, whereby the pressure of said yieldable wall against the edge of the tape can be regulated by adjusting the cylindrical part.

6. In a code tape transmitter, an optical scanning box, means carried by said box for supporting a tape in scanning position, means for vertically adjusting said box to any one of a plurality of operative positions, and multi-speed mechanism for driving the tape at a speed dependent upon the position of the scanning box, said mechanism comprising a plurality of tape driving elements so arranged that each position of the scanning box automatically brings the tape into driving relation with one of said elements.

7. In combination with optical scanning mechanism for a marked tape, an adjustable arm carrying a spool provided with a circumferential groove adapted to support the tape in scanning position, a member supported independently of sâid arm for holding the tape in said groove along a narrow transverse line of contact, said member having an opening for the passage of the scanning beam, and means whereby said spool and member are normally urged toward each other to hold the tape in pressure contact, said means permitting easy manual adjustment of said arm to move the spool away from said member for insertion of the tape.

8. In a code type transmitter, scanning mechanism for a coded tape of prescribed width, a pulley operated at a constant speed for driving the tape past the scanning mechanism, said pulley having a plurality of stepped rims of the same width and each adapted to engage the tape, each rim driving the tape at a different scanning speed, means for holding said coded tape in driving contact with any one of said rims, and guide means adjustable to support the tape in scanning position for any selected driving rim.

9. In a code tape transmitter, scanning mechanism for a coded tape, a pulley operated at a constant speed for driving the tape past the scanning mechanism, said pulley having a plurality of stepped rims adapted to engage the tape, each rim driving the tape at a different scanning speed, a pivoted arm carrying a pressure roller for the tape, and means for adjusting said arm to bring the roller into driving contact with the tape on any one of said rims.

10. In a code tape transmitter, an adjustable frame carrying an optical scanning unit for a coded tape, a guide on said frame for holding the tape in scanning position, a driving pulley for the tape, said pulley being provided with a plurality of tape engaging surfaces, each of which drives the tape at a different speed, a pressure member carried by said frame for holding the tape in driving contact with the pulley surfaces, and means for securing said frame in any one of a plurality of adjusted positions corresponding to the various transmission speeds, whereby said tape guide and pressure member are supported in correct relation to each one of said tape driving surfaces.

11. In a code tape transmitter, scanning mechanism for a coded tape, means for feeding the tape through said mechanism, a motor for operating said tape feeding means, a movable member engaged by the tape before it enters the scanning mechanism, means whereby said member opens the motor circuit when moved by the tape becoming taut, and a latch for automatically locking said member in operated position independently of the tape, said latch being releasable for the return of said member to normal circuit closing position.

12. In a code tape transmitter, scanning mechanism for a coded tape, means for feeding the tape through said mechanism, a motor for operating said tape feeding means, a movable guide member arranged to form a loop in the tape before it enters the scanning mechanism, said guide member being normally in a predetermined position and adapted to be moved out of such position by the tape becoming taut, means controlled by said guide member when moved out of normal position for stopping the motor, automatic means for locking said guide member in motor stopping position independently of the tape, and a magnet for releasing said locking means and thereby causing said guide member to resume its normal position.

13. In a tape telegraph transmitter having optical scanning mechanism, a pivoted arm movable in a vertical plane, a horizontal stud carried by said arm, a guide mounted on said stud for holding the tape in scanning position, means for adjusting said guide horizontally on said stud and securing it in adjusted position, and means for adjusting said arm about its pivot to bring said guide into proper vertical position, whereby the tape area to be scanned is correctly positioned in both planes with respect to the scanning beam.

14. In a tape telegraph transmitter, an optical scanning head having a base plate, an arm pivotally mounted on said base plate and movable in a vertical plane, a spool carried by said arm at one end thereof to hold the tape in scanning position, means for adjusting said pulley laterally of said arm, a spring constantly tending to rock the spool end of said arm upward, and a stop on said end of the arm arranged to engage said base plate to limit the upward movement of the arm, said stop being adjustable to determine the correct vertical position of the spool on said arm, whereby the tape area to be scanned is correctly positioned both vertically and horizontally with respect to the scanning head.

15. A code tape transmitter comprising a base, a pair of vertical plates mounted on said base, a motor mounted on the base between said plates, an optical scanning box supported between said plates above the motor, said scanning box being a self-contained unit with an exciter lamp and a photocell, a tape guide carried by said scanning box to feed a coded tape through the scanning field, said guide holding the coded tape in a position to reflect light from said exciter lamp to said photocell, a tape driving pulley mounted to one side of said guide and operatively connected with said motor, said pulley having a rim for engaging the tape and holding it in alignment with said guide during a scanning operation, and pressure means for holding the tape in driving contact with the pulley.

16. In a tape telegraph transmitter, a box containing optical scanning mechanism, a pair of vertical plates between which said box is mounted, said plates having each a plurality of stepped abutments arranged to support the box in different horizontal and vertical positions, a tape guide movable with said box to hold the tape in the scanning field of said mechanism for any position of the box, and a driving device for said tape having a plurality of tape engaging elements corresponding to the different positions of said scanning box, each element driving the tape at a different speed.

17. A code tape transmitter comprising a base, a motor mounted on said base, an optical scanning box supported above the motor, a tape guide carried by said scanning box to feed a coded tape through the scanning field, a tape driving pulley mounted on said base and operatively connected with said motor, said pulley having a plurality of concentric rims which are axially displaced so that each rim operates in a different vertical plane and on a different horizontal level, means for adjusting said scanning box and tape guide as a unit to a plurality of different positions corresponding to the different pulley rims, so that each rim holds the tape in operative relation to said guide, and pressure means carried by said scanning box for holding the tape in driving contact with the pulley.

RALEIGH J. WISE.
ROBERT D. PARROTT.

REFERENCES CITED

The following references are of record in the file of this patent:

UNITED STATES PATENTS

| Number | Name | Date |
|---|---|---|
| Re. 18,756 | Jenkins | Mar. 7, 1933 |
| 836,710 | Rogers | Nov. 27, 1906 |
| 1,144,236 | Peirce | June 22, 1915 |
| 1,326,864 | Herman | Dec. 30, 1919 |
| 1,826,858 | Zworykin | Oct. 13, 1931 |
| 1,949,878 | Porter | Mar. 6, 1934 |
| 1,953,072 | Casper | Apr. 3, 1934 |
| 1,972,555 | Fear | Sept. 4, 1934 |
| 1,981,255 | Vollenweider | Nov. 20, 1934 |
| 2,064,049 | Wurm et al. | Dec. 13, 1936 |
| 2,064,050 | Wurm | Dec. 13, 1936 |
| 2,177,077 | Potts | Oct. 24, 1939 |
| 2,266,349 | Wimpe | Dec. 16, 1941 |
| 2,307,099 | Apperley | Jan. 5, 1943 |
| 2,313,583 | Ressler | Mar. 9, 1943 |
| 2,317,850 | Finch | Apr. 27, 1943 |
| 2,332,142 | Hajos | Oct. 19, 1943 |
| 2,353,608 | Zenner | July 11, 1944 |
| 2,382,251 | Parker | Aug. 14, 1945 |
| 2,403,918 | Grosdoff | July 16, 1946 |

FOREIGN PATENTS

| Number | Country | Date |
|---|---|---|
| 599,001 | Germany | June 22, 1934 |